United States Patent [19]

Dörr et al.

[11] 4,333,917

[45] Jun. 8, 1982

[54] PROCESS OF PRODUCING SULFURIC ACID

[75] Inventors: Karl H. Dörr, Mainz; Helmut Diekmann, Karben; Hugo Grimm, Miltenberg; Ulrich Sander, Friedrichsdorf; Michael Tacke; Waldemar Weber, both of Offenbach, all of Fed. Rep. of Germany

[73] Assignee: Metallgesellschaft Aktiengesellschaft, Frankfurt am Main, Fed. Rep. of Germany

[21] Appl. No.: 119,289

[22] Filed: Feb. 7, 1980

[30] Foreign Application Priority Data

Oct. 2, 1979 [DE] Fed. Rep. of Germany ....... 2905083

[51] Int. Cl.³ .................. C01B 17/74; C01B 17/98; C01B 17/48; B01D 3/00
[52] U.S. Cl. .................................... 423/522; 423/533; 422/161; 203/12
[58] Field of Search ................ 423/522, 533, 531; 422/160, 101; 203/12

[56] References Cited

U.S. PATENT DOCUMENTS 2,357,195 8/1944 Herrmann ........................... 423/531
2,415,142 2/1947 McHaffie et al. .................. 423/536
3,853,502 12/1974 Dorr et al. .......................... 423/522
4,177,248 12/1979 Richard ............................... 423/522
4,212,855 7/1980 Kerner et al. ...................... 423/522

FOREIGN PATENT DOCUMENTS 2529708 1/1977 Fed. Rep. of Germany ...... 423/522

Primary Examiner—Gary P. Straub
Attorney, Agent, or Firm—Sprung, Horn, Kramer & Woods

[57] ABSTRACT

A process for the production of sulfuric acid from wet sulfur dioxide containing gases is disclosed. The sulfur dioxide containing gas is initially purified and cooled, then predried with dilute sulfuric acid, finally dried with concentrated sulfuric acid, converted to sulfur trioxide catalytically and, the sulfur trioxide is absorbed in sulfuric acid. Preliminary drying removes more water than needed to maintain the water balance in the following process steps. A portion of the dilute acid from the preliminary drying is concentrated prior to recycle to the preliminary drying step and another portion of the acid from the preliminary dryer is added to the sulfur trioxide absorber to adjust the water balance in the acid circulating between the final dryer and the sulfur trioxide absorber.

8 Claims, 3 Drawing Figures

PROCESS OF PRODUCING SULFURIC ACID

BACKGROUND OF THE INVENTION

1. Field of the Invention

This invention relates to a process of producing sulfuric acid from $SO_2$-containing gases comprising forming $SO_3$ by a catalytic reaction and absorbing the $SO_3$ in concentrated sulfuric acid, in which process the $SO_2$-containing gas is purified and cooled, $SO_2$-containing gas which has been purified and cooled is predried in contact with dilute sulfuric acid, the $SO_2$-containing gas is finally dried with concentrated sulfuric acid, and dilute sulfuric acid which has been used for predrying is strengthened in direct contact with water-absorbing gases and is returned to the preliminary drying stage.

2. Discussion of the Prior Art

In a conventional acid system of the contact process plant, sulfuric acid is produced in that $SO_2$ is catalytically reacted to form $SO_3$ and the latter is absorbed in sulfuric acid. The $SO_2$-containing gases are dried with concentrated sulfuric acid before they are fed to the contact process plant. The drying acid absorbs the water which is contained in the $SO_2$-containing gases and is thus diluted. The concentration of the drying acid is maintained at a constant value since part of the drying acid is replaced by concentrated absorbing acid. To produce a product acid having a desired sulfuric acid concentration, the water balance of the system must be maintained. To that end, the amount of water absorbed by the drying acid must not exceed a certain value, which depends on the $SO_2$ content of the gas. If the $SO_2$-containing gases contain more water, the surplus water content must be removed before the drying step. For this purpose the $SO_2$-containing gases before being dried are cooled to a temperature at which surplus water condenses and the residual water vapor content of the gas does not exceed the water balance. The $SO_2$-containing gases are cooled to that temperature in a conventional gas-purifying and -cooling plant, in which cooling is properly effected. The gases are cooled by a direct contact of the gases with dilute sulfuric acid and/or water or are indirectly, cooled by means of water and/or air. The cooling effect is limited by the temperature of the water or air which is available.

If the scrubbing and cooling acid is subjected to direct cooling, as is described in British Pat. No. 744,465, the cooling effect will be restricted by the temperature and the moisture content of the air. Air having a high humidity can effect only a small evaporation of water and has a correspondingly small cooling effect. In that process, the $SO_2$-containing hot gases are cooled and scrubbed in a first stage of the conventional gas-purifying and -cooling plant with circulating dilute sulfuric acid having a concentration of 45 percent, part or all of the used scrubbing acid is cooled by a direct contact with air, whereby water is evaporated, and the cooled scrubbing acid is recycled to the scrubber. In a second stage, the gases are cooled further by a direct contact with a scrubbing fluid which is circulated and is cooled by an indirect heat exchange. As a result, the final cooling in the second stage depends again on the temperature of the coolant. The limitation of the cooling temperature is particularly critical with gases which have a low $SO_2$ content, e.g., below 5 percent by volume and, when oleum is to be produced, also with gases having a low $SO_2$ content, e.g., below 6 percent by volume. The purified and cooled gases are generally treated for a removal of sulfuric acid mists, which would otherwise pass through the dryer and enter the contact process plant. This removal of sulfuric acid mists is usually effected in a mist-collecting electrostatic precipitator. As described in U.S. Pat. No. 3,684,440 and German Pat. No. 1,992,012, a coolant at high temperatures can be used to cool the gas to low temperatures in a conventional gas-purifying and cooling plant if the end gas of the contact process plant is employed. In that case the hot gases are scrubbed in a first stage with dilute sulfuric acid of 2 to 7 percent concentration and the used scrubbing acid is cooled in direct contact with the end gas with evaporation of water and is recycled to the scrubber. The end gas may be precooled by an indirect heat exchange. The $SO_2$-containing cooled gases are then fed in the usual manner to a mist-collecting electrostatic precipitator. That process has the disadvantage that a large part of the $SO_2$ in solution in the highly dilute sulfuric acid is driven out by the end gas and enters the atmosphere when the $SO_2$ content in the end gas amounts only to 500 ppm, as is generally required at the present time, rather than the stated 1500 ppm.

If the $SO_2$-containing gas cannot be cooled in the conventional gas-purifying and cooling plant to the low temperature required to maintain the water balance because the cooling water or cooling air is at an excessively high temperature, the remaining surplus water content of the $SO_2$-containing gases can be removed by a preliminary drying with dilute sulfuric acid.

It is known from U.S. Pat. No. 2,415,142 that the surplus water content of $SO_2$-containing gases which have been conventionally purified and cooled can be removed by a preliminary drying with dilute sulfuric acid of 35 to 85 percent weight, which is conducted in a countercurrent to the gas, whereafter the dilute sulfuric acid effluent is reheated, if desired, and is strengthened in direct countercurrent contact with the end gas of the contact plant, and the strengthened sulfuric acid is cooled and is then re-used for preliminary drying. This process can be performed in a plurality of stages but has the disadvantage that all of the dilute sulfuric acid is pumped into the strengthener. A relatively large amount of $SO_2$ is driven off in the strengthener and enters the exhaust gas.

It is an object of the invention to remove by an economical preliminary drying any surplus water from the $SO_2$-containing gases which have been conventionally purified and cooled and to minimize the amount of $SO_2$ which enters the atmosphere.

SUMMARY OF INVENTION

This object is accomplished according to the invention in that (a) dilute sulfuric acid having a concentration of 30 to 70 percent by weight is circulated in a preliminary drying stage;

(b) a partial stream of dilute sulfuric acid is withdrawn from the preliminary drying cycle and in a strengthening stage is strengthened in direct contact with water-absorbing gases and is then returned to the preliminary drying stage at a concentration which is substantially higher e.g. at least 2 weight percent higher, that the concentration of the dilute sulfuric acid in the preliminary drying cycle;

(c) the partial stream of dilute sulfuric acid is circulated in the strengthening stage and is heated therein by an indirect heat exchange;

(d) the dilute sulfuric acid circulating in the preliminary drying stage is cooled by an indirect heat exchange;

(e) the temperature of the $SO_2$-containing gas leaving the preliminary drying stage is maintained as high as or higher than the temperature of the gases entering the preliminary drying stage;

(f) more water is removed from the $SO_2$-containing water in the preliminary drying stage than is theoretically required to be removed in order to obtain a product sulfuric acid of the desired concentration, and the water which is removed in excess of the theoretical amount is transferred as dilute sulfuric acid from the preliminary drying stage to the conventional acid system of the contact process plant and is withdrawn as product sulfuric acid from the acid system; and (g) the loss of sulfuric acid contained in the dilute sulfuric acid which is withdrawn form the preliminary drying stage in step (f) is compensated by an addition of concentrated sulfuric acid having a suitable sulfuric acid content from the conventional acid system of the contact process plant.

The water-absorbing gas may consist of the end gas of the contact process plant or of air, pure flue gas or a mixture of said gases. A constant sulfuric acid concentration is maintained in the preliminary drying cycle and in the strengthening cycle. The rate of the partial stream fed from the preliminary drying stage into the strengthening stage and the rate and concentration of the partial stream fed from the strengthening stage to the preliminary drying stage are adjusted so that the concentration in each cycle remains constant and water is fed at the desired rate from the preliminary drying stage to the strengthening stage. The acid concentration in the preliminary drying stage and the temperature of the acid leaving said stage are selected so that the acid absorbs water at the desired rate from the $SO_2$-containing gas. The temperature of the acid leaving the preliminary drying stage exceeds the temperature of the acid which enters said stage. The heat which is generated by the absorbtion of water by the acid is dissipated by an indirect heat exchange with a cooling fluid and by the $SO_2$-containing gas. The acid concentration in the strengthening cycle and the temperature of the acid entering said cycle are selected so that the water-absorbing gas absorbs water at the desired rate from the acid. The temperature of the acid leaving the strengthening stage is lower than the temperature of the acid which enters said stage. The heat loss is compensated by the indirect heat exchange and by the sensible heat of the water-absorbing gases. The heating by an indirect heat exchange can be effected with absorber acid, steam etc. Because water is removed in the preliminary drying stage in excess of the amount which is theoretically required to be removed and the water removed in excess is transferred as sulfuric acid at a corresponding rate to the conventional acid system of the contact process plant, only a small partial stream of dilute sulfuric acid is withdrawn from each of the preliminary drying and strengthening stages. This will prevent an enriching of the dilute sulfuric acid with impurities which are contained in very small quantities in the $SO_2$-containing gas even after its conventional purification. The conventional acid system of the contact process plant comprises the final dryer, the final absorber and possibly the interstage absorber and oleum tower. Alternatively, more water can be removed in the preliminary drying stage and can be removed by the water-absorbing gas in the strengthening stage. That practice may be of advantage under strongly fluctuating operating conditions. In that case, the lacking water is added to the conventional acid system of the contact process plant in the required proportion from the outside. Preliminary drying and strengthening may be effected in venturi apparatus, empty towers or packed towers.

According to a preferred further feature the dilute sulfuric acid withdrawn from the preliminary drying stage in step (f) is fed to the final dryer. As a result, the $SO_2$ content of the dilute sulfuric acid is supplied to the $SO_2$-containing gas which enters the contact process plant.

According to a further preferred feature the concentration of the dilute sulfuric acid which has been strengthened in step (b) is 2 to 40 percent by weight higher than the concentration of the dilute sulfuric acid in the preliminary drying cycle. As a result, only a small partial stream of dilute sulfuric acid must be fed from the preliminary drying stage to the strengthening stage and the $SO_2$ content of the exhaust gas is very low.

According to a further preferred feature, the temperature of the $SO_2$-containing gas leaving the preliminary drying stage in step (e) is 5° to 20° C. higher than the temperature of the $SO_2$-containing gas entering the preliminary drying stage. As a result, the surface areas of the coolers may be small because heat is dissipated by the $SO_2$-containing gas.

According to a further preferred feature the gas is subjected to a first preliminary drying before its preliminary drying in steps (a) to (g), the dilute sulfuric acid used for the first preliminary drying is strengthened in an additional strengthening stage in direct contact with water-absorbing gases approximately to the concentration required for the first preliminary drying and is then re-used for the first preliminary drying, the temperature in the first preliminary drying stage is controlled so that water at the desired rate is absorbed by the dilute sulfuric acid when the latter has the selected concentration, and water is expelled at said rate in the additional strengthening stage at a predetermined temperature of the water-absorbing gas. The strengthening stages may be connected in series or parallel in the gas flow path. In that case, small heat exchange surface areas are sufficient for the cycles of the dilute sulfuric acid.

According to a further preferred feature, the preliminary drying is effected in two series-connected preliminary driers, a partial stream of the dilute sulfuric acid from the cycle of the second preliminary dryer in the gas flow path is fed to the first preliminary dryer, the dilute sulfuric acid is maintained at a higher concentration in the cycle of the second preliminary drier than in the cycle of the first preliminary dryer, strengthening is effected in two strengtheners, which are connected in series in the acid flow path, a partial stream of the dilute sulfuric acid is fed from the cycle of the first preliminary drier to the first strengthener in the acid flow path, a partial stream of the strengthened dilute sulfuric acid is fed from the cycle of the first strengthener to the second strengthener, a partial stream of strenghtened dilute sulfuric acid is fed from the cycle of the second strengthener to the second preliminary drier, and a constant concentration is maintained in each acid cycles. The strengtheners may be connected in series or parallel in the gas flow path. As a result, it is sufficient to feed dilute sulfuric acid at a very low rate from the preliminary drying stage to the strengthening stage so that SO₂ from the dilute sulfuric acid enters the exhaust gas only at a very low rate.

According to a preferred feature the first preliminary drying is effected with the gas and dilute sulfuric acid flowing countercurrently to each other so that the dilute sulfuric acid absorbs only very little SO₂.

According to a further preferred feature the temperature of the SO₂-containing gases leaving the final drier is controlled at 70° to 90° C. In that case, small heat exchange surface area are sufficient and the heat balance of the contact process system is improved.

According to a preferred further feature, in the processing of SO₂-containing gases containing more than 4 percent SO₂ only part of said gases are fed to the preliminary drying stage and are treated therein to remove water at the rate which is required to be removed in view of the entire volume of the SO₂-containing gases. Small preliminary driers are sufficient in that case.

BRIEF DESCRIPTION OF DRAWINGS

The invention will be explained more fully with reference to the drawings and examples.

Figure 1:
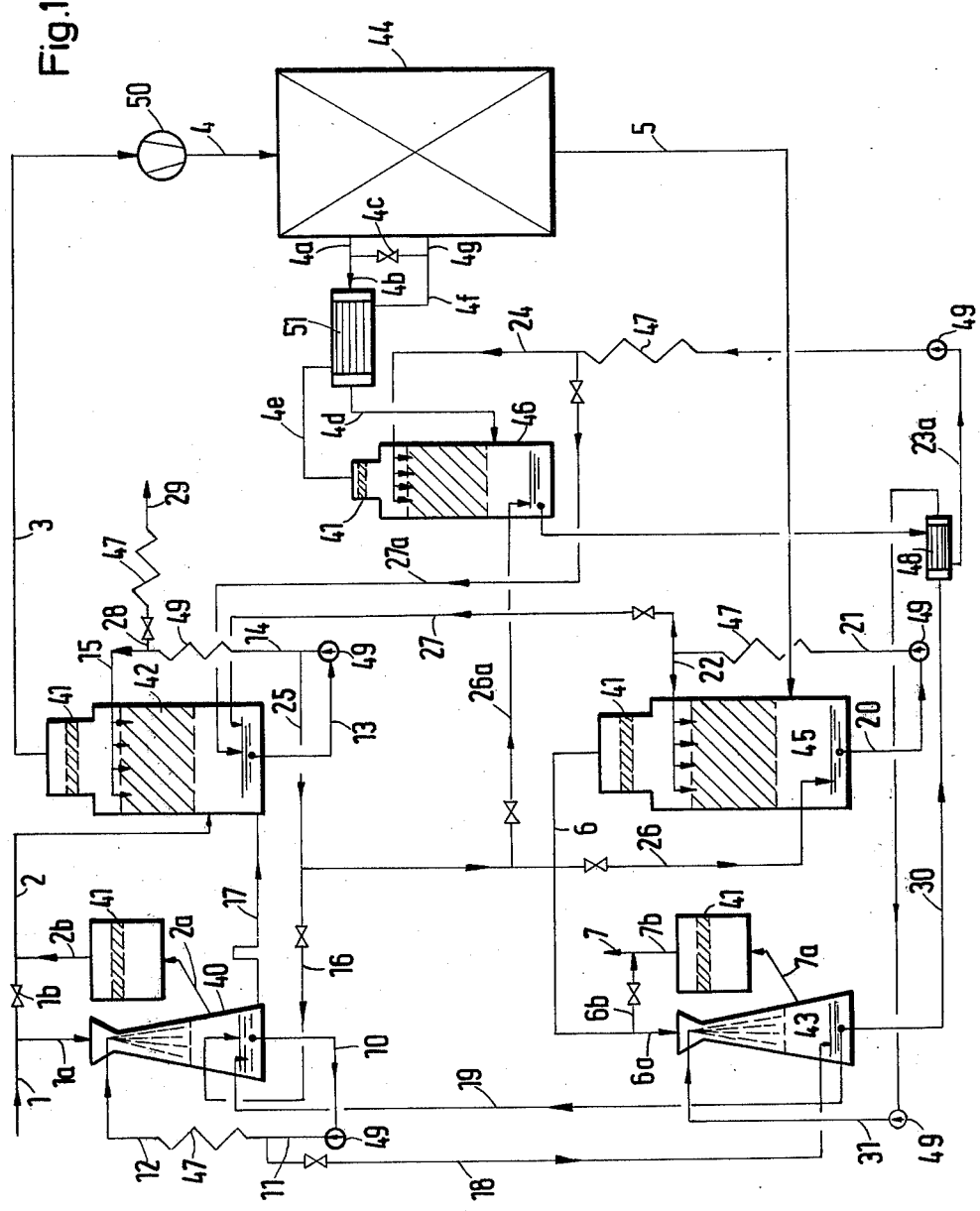
FIG. 1 is a flow scheme for feed gases which contain 4.5 percent SO₂. Only a partial gas stream is fed to the preliminary drying stage. There is only one preliminary drying stage and only one strengthening stage, and the dilute sulfuric acid is circulated in each of said stages.

This heating by extraneous heat may be desirable if the feed gas has a low SO₂ content below about 3 percent and may be effected before or in the contact process system.

Figure 2:
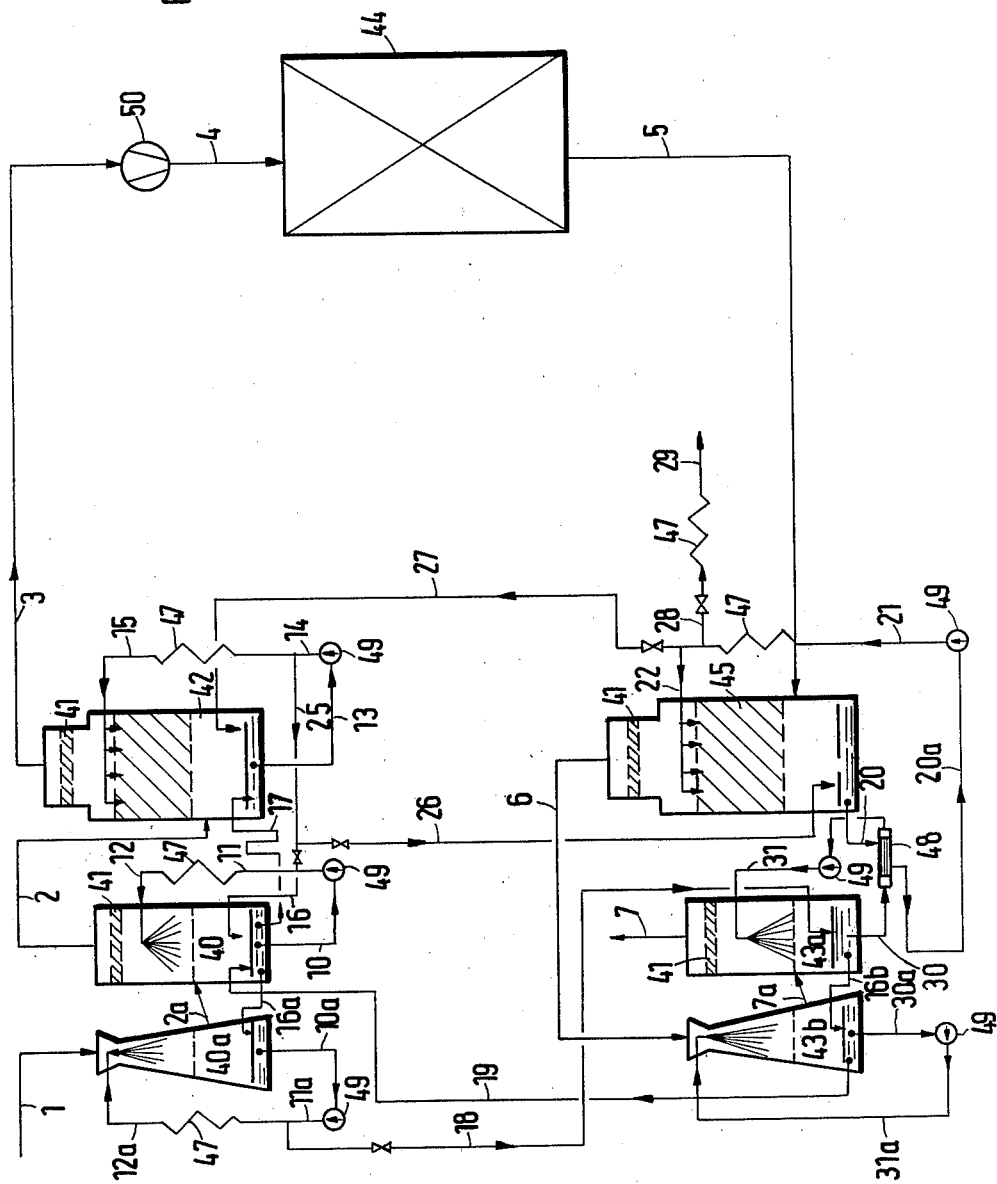
FIG. 2 is a flow scheme for feed gases which contain 3 percent SO₂. There are two preliminary drying stages and two strengthening stages and the dilute sulfuric acid is circulated in each stage.
Figure 3:
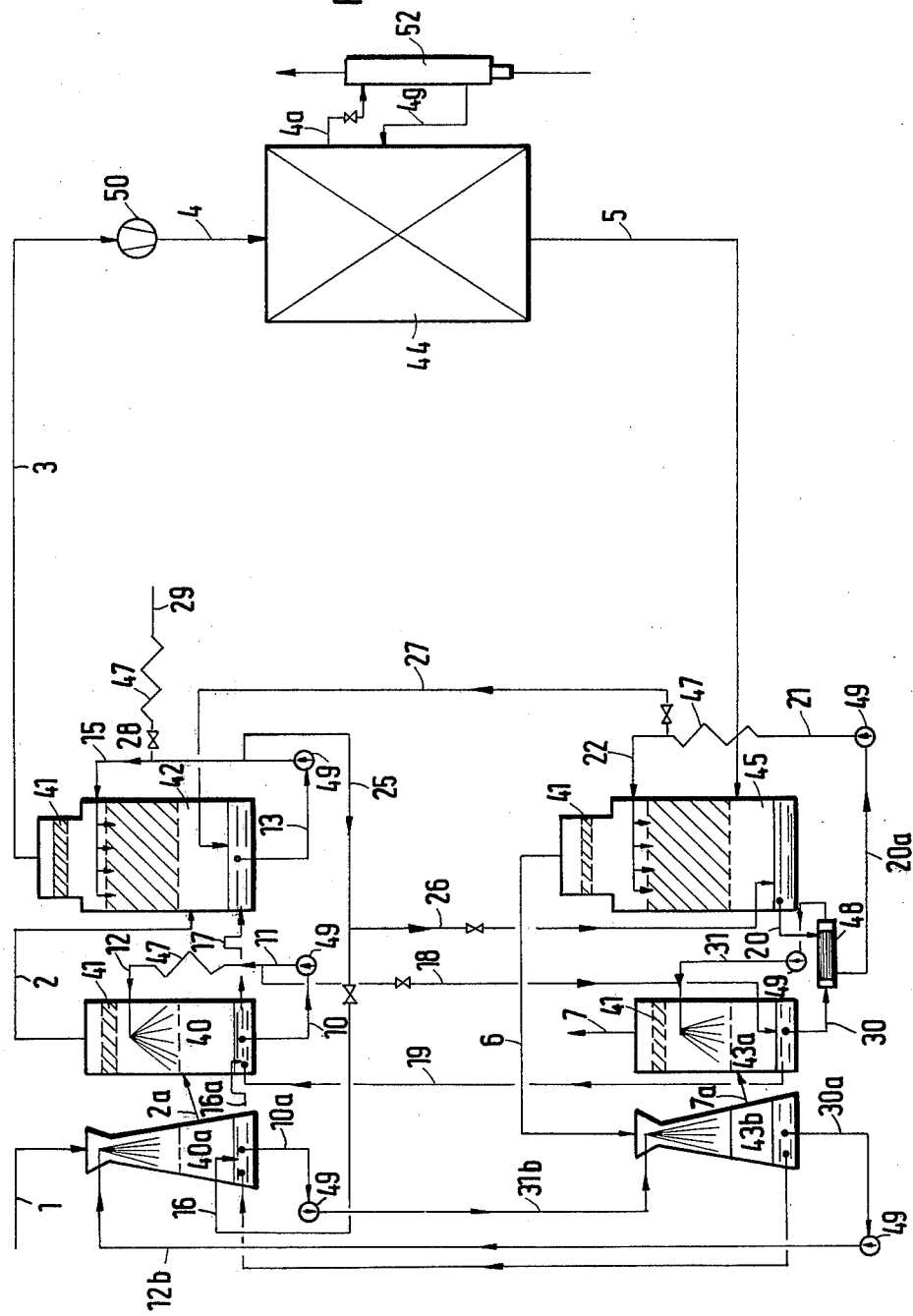
FIG. 3 is a flow scheme for feed gases which contain 1.7 percent SO₂. There are two preliminary drying stages and two strengthening stages. The dilute sulfuric acid is circulated in each preliminary drying stage and in the first strengthening stage. The SO₂-containing gas is heated by extraneous heat in the contact process system.

In the drawings, the reference characters designate the following parts:

| | | |
|---|---|---|
| 1 | to 4 | gas conduits for the SO₂-containing gases |
| 5 | | gas conduit for feeding SO₃-containing gas from the last contacting tray to the final absorber |
| 6, 7 | | gas conduits for the end gas from the final absorber |
| 10 | to 12, | acid conduits for the dilute sulfuric acid |
| 16a | to 19, | |
| 30, 31 | | |
| 13 | to 16, | acid conduits for the concentrated drying acid |
| 25, 26 | | |
| 20 | to 22, | acid conduits for the concentrated acid for the final absorber |
| 27 | to 29 | |
| 23, 24, 27s, 28 | | acid conduits for the concentrated acid for the interstage absorber (only FIG. 1) |
| 40 | | preliminary dryer: cocurrent-flow venturi (FIG. 1) spray tower (FIG 2,3) |
| 40a | | first preliminary dryer: cocurrent-flow venturi (FIGS. 2,3) |
| 41 | | spray separator |
| 42 | | dryer |
| 43 | | strengthener: cocurrent-flow venturi (FIG. 1) |
| 43a | | first strengthener spray tower (FIGS. 2,3) |
| 43b | | second strengthener: |

| | |
|---|---|
| | cocurrent-flow venturi (FIGS. 2,3) |
| 44 | contact process system |
| 45 | final absorber |
| 46 | interstage absorber |
| 47 | acid cooler |
| 48 | reheater for dilute sulfuric acid |
| 49 | acid pumps |
| 50 | blowers |
| 51 | gas heat exchangers (FIG. 3) |
| 52 | reheater supplied with extraneous heat (FIG. 3) |

EXAMPLES

Statements of quantities have the following meanings:
(a) Gas
"percent" means percent by volume of dry gas
"standard m³" means standard M³/h
"g H₂O" means g of water per standard m³ of dry gas
(b) Acids
"percent sulfuric acid" means sulfuric acid content in percent by weight
"kg" means kg/h.

SO₂-containing gas which has been conventionally purified and cooled in a plant comprising a mist-collecting electrostatic precipitator is conducted in conduit 1.

EXAMPLE ACCORDING TO FIG. 1

Conduit 1 55,460 standard m³ (50,000 standard m³ of dry gas; 4.5% SO₂; 14.7% O₂; 80.8% N₂; 45° C.; 84 g H₂O
conduit 1a 33,276 standard m³; 45° C.; 84 g H₂O
conduit 1b 22,184 standard m³; 45° C.; 84 g H₂O
conduit 2a 30,936 standard m³; 57° C.; 24g H₂O
conduit 2b 30,936 standard m³; 57° C.; 24g H₂O
conduit 2 53,120 standard m³; 52° C.; 48g H₂O
conduit 3 50,000 standard m³; 80° C.; dry (50–100 mg H₂O)
conduit 4 50,000 standard m³; 115° C.
conduit 4a 48,987 standard m³; 500° C.
conduit 4b 30,000 standard m³; 500° C.
conduit 4c 18,987 standard m³; 500° C.
conduit 4d 30,000 standard m³; 210° C.
conduit 4e 28,760 standard m³; 100° C.
conduit 4f 28,760 standard m³; 400° C.
conduit 4g 47,747 standard m³; 440° C.
conduit 5 47,643 standard m³; 170° C.
conduit 6 46,649 standard m³; 85°–90° C.
conduit 6a 36,649 standard m³; 85°–90° C.; dry
conduit 6b 10,000 standard m³; 85°–90° C.
conduit 7a 38,738 standard m³; 81° C.; 43.86 g H₂O
conduit 7b 38,738 standard m³; 81° C.; 43.86 g H₂O
conduit 7 48,738 standard m³; 82°–83° C.; 32.97 g H₂O 500 ppm SO₂; traces of SO₃ and H₂SO₄ mist
conduit 10 244,775 kg of 60% sulfuric acid; 57° C.
conduit 11 244,775 kg of 60% sulfuric acid; 57° C.
conduit 12 227,090 kg of 60% sulfuric acid; 49° C.
conduit 13 357,624 kg of 93% sulfuric acid; 98° C.
conduit 14 310,753 kg of 93% sulfuric acid; 98° C.
conduit 15 300,000 kg of 93% sulfuric acid; 80° C.
conduit 16 350 kg of 93% sulfuric acid; 98° C.
conduit 17 543 kg of 60% sulfuric acid; 57° C.
conduit 18 17,685 kg of 60% sulfuric acid; 57° C.
conduit 19 16,077 kg of 66% sulfuric acid; 81° C.
conduit 20 320,321 kg of 98.8% sulfuric acid; 113° C.
conduit 21 320,321 kg of 98.8% sulfuric acid; 113° C.
conduit 22 300,000 kg of 98.8% sulfuric acid; 90° C.
conduit 23 334,180 kg of 98.3% sulfuric acid; 128° C.

conduit 23a  334,180 kg of 98.3% sulfuric acid; 120.7° C.
conduit 24  300,000 kg of 98.3% sulfuric acid; 100° C.
conduit 25  46,871 kg of 93% sulfuric acid; 98° C.
conduit 26  17,209 kg of 93% sulfuric acid; 98° C.
conduit 26a  29,312 kg of 93% sulfuric acid; 98° C.
conduit 27  16,198 kg of 98.8% sulfuric acid; 90° C.
conduit 27a  27,730 kg of 98.3% sulfuric acid; 100° C.
conduit 28  10,753 kg of 93% sulfuric acid; 80° C.
conduit 29  10,753 kg of 93% sulfuric acid; 50° C.
conduit 30  228,698 kg of 66% sulfuric acid; 81° C.
conduit 31  227,090 kg of 66% sulfuric acid; 88.5%

EMBODIMENT ACCORDING TO FIG. 2

Conduit 1  53,646 standard m$^3$ (50,000 standard m$^3$ of dry gas); 3.0% $SO_2$; 16.2% $O_2$; 80.8% $N_2$; 38° C.; 56.1 g $H_2O$
conduit 2a  52,600 standard m$^3$; 43° C.; 40.0 g $H_2O$
conduit 2  51,494 standard m$^3$; 42° C.; 23.0 g $H_2O$
conduit 3  50,000 standard m$^3$; 80° C.; dry (50–100 mg $H_2O$
conduit 4  50,000 standard m$^3$; 110° C.
conduit 5  49,257 standard m$^3$; 160° C.
conduit 6  47,772 standard m$^3$; 82°–90° C.; dry
conduit 7a  48,393 standard m$^3$; 62° C.
conduit 7  49,715 standard m$^3$; 65° C.; 31.28 g $H_2O$; 500 ppm $SO_2$; traces of $SO_3$ and $H_2SO_4$ mist
conduit 10  125,446 kg of 50% sulfuric acid; 48° C.
conduit 11  125,446 kg of 50% sulfuric acid; 48° C.
conduit 12  125,446 kg of 50% sulfuric acid; 40° C.
conduit 10a  128,934 kg of 40% sulfuric acid; 43° C.
conduit 11a  128,934 kg of 40% sulfuric acid; 43° C.
conduit 12a  125,446 kg of 40% sulfuric acid; 38° C.
conduit 13  349,797 kg of 96% sulfuric acid; 95° C.
conduit 14  349,797 kg of 96% sulfuric acid; 95° C.
conduit 15  300,000 kg of 96% sulfuric acid; 80° C.
conduit 16  174 kg of 96 sulfuric acid; 95° C.
conduit 16a  2760 kg of 50% sulfuric acid; 48° C.
conduit 16b  3346 kg of 70% sulfuric acid; 67° C.
conduit 17  334 kg of 50% sulfuric acid; 48° C.
conduit 18  3488 kg of 40% sulfuric acid; 43° C.
conduit 19  1993 kg of 70% sulfuric acid; 62° C.
conduit 20  355,013 kg of 98.6% sulfuric acid; 120° C.
conduit 20a  355,013 kg of 98.6% sulfuric acid; 115° C.
conduit 22  300,000 kg of 98.6% sulfuric acid; 90° C.
conduit 21  355,013 kg of 98.6% sulfuric acid; 115° C.
conduit 25  49,797 kg of 96% sulfuric acid; 95° C.
conduit 26  49,623 kg of 96% sulfuric acid; 95° C.
conduit 27  48,313 kg of 98.6% sulfuric acid; 90° C.
conduit 28  6700 kg of 98.6% sulfuric acid; 90° C.
conduit 29  6700 kg of 98.6% sulfuric acid; 50° C.
conduit 30  130,000 kg of 60% sulfuric acid; 67° C.
conduit 31  130,000 kg of 60% sulfuric acid; 77° C.
conduit 30a  130,000 kg of 70% sulfuric acid; 62° C.
conduit 31a  130,000 kg of 70% sulfuric acid; 62° C.

EMBODIMENT ACCORDING TO FIG. 3

Conduit 1  53,646 standard m$^3$ (50,000 standard m$^3$ of dry gas); 1.7% $SO_2$; 17.5% $O_2$; 80.8% $N_2$; 38° C.; 56.1 g $H_2O$
conduit 2a  52,600 standard m$^3$; 60° C.; 40.0 g $H_2O$
conduit 2  51,040 standard m$^3$; 42° C.; 16 g $H_2O$
conduit 3  50,000 standard m$^3$; 83° C.; dry (50–100 mg $H_2O$)
conduit 4  50,000 standard m$^3$; 110° C.
conduit 4a  16,000 standard m$^3$; 364° C.
conduit 4g  16,000 standard m$^3$; 480° C.
conduit 5  49,583 standard m$^3$; 170° C.
conduit 6  48,750 standard m$^3$; 75°–80° C.; dry
conduit 7a  49,796 standard m$^3$; 52° C.; 20.52 g $H_2O$
conduit 7  51,139 standard m$^3$; 65° C.; 37.71 g $H_2O$; 500 ppm $SO_2$; traces of $SO_3$ and $H_2SO_4$ mist
conduit 10  202,144 kg of 56% sulfuric acid; 51.3° C.
conduit 11  202,144 kg of 56% sulfuric acid; 51.3° C.
conduit 12  186,648 kg of 56% sulfuric acid; 40° C.
conduit 10a  58,648 kg of 56% sulfuric acid; 60° C.
conduit 12b  57,843 kg of 56.78% sulfuric acid; 48° C.
conduit 13  260,894 kg of 93% sulfuric acid; 83° C.
conduit 14  244,009 kg of 93% sulfuric acid; 83° C.
conduit 15  240,000 kg of 93% sulfuric acid; 83° C.
conduit 16  253 kg of 93% sulfuric acid; 83° C.
conduit 16a  253 kg of 56% sulfuric acid; 60° C.
conduit 17  420 kg of 56% sulfuric acid; 51.3° C.
conduit 18  15,496 kg of 56% sulfuric acid; 50° C.
conduit 19  14,463 kg of 60% sulfuric acid; 67° C.
conduit 20  259,507 kg of 98.8% sulfuric acid; 110° C.
conduit 20a  259,507 kg of 98.8% sulfuric acid; 100° C.
conduit 21  259,507 kg of 98.8% sulfuric acid; 100° C.
conduit 22  240,000 kg of 98.8% sulfuric acid; 80° C.
conduit 25  16,718 kg of 93% sulfuric acid; 83° C.
conduit 27  19,507 kg of 98.8% sulfuric acid; 80° C.
conduit 28  4009 kg of 93% sulfuric acid; 83° C.
conduit 29  4009 kg of 93% sulfuric acid; 50° C.
conduit 30  171,770 kg of 60% sulfuric acid; 67° C.
conduit 31  171,770 kg of 60% sulfuric acid; 77° C.
conduit 30a  57,843 kg of 56.78 sulfuric acid; 49° C.
conduit 31b  58,648 kg of 56% sulfuric acid; 59° C.
conduit 26  16,465 kg of 93% sulfuric acid; 83° C.

The advantages afforded by the invention reside in that the surplus water content of gases having a high water content and relatively low concentration can be removed economically and in a technically simple manner so that very little $SO_2$ enters the atmosphere, additional waste products do not become available, and the use of extraneous heat for removing surplus water is not required although it may be desirable in the processing of feed gases having a low $SO_2$ content of about 1.5 to 3% because the required heat exchange surface areas can then be decreased.

What is claimed is:

1. In a process for producing sulfuric acid from $SO_2$-containing gases containing more water than required for sulfuric acid production comprising forming $SO_3$ by a catalytic reaction and absorbing the $SO_3$ in concentrated sulfuric acid, in which process the $SO_2$-containing gas is purified and cooled, the cooled gases containing more water than required for concentrated sulfuric acid production, at least part of the $SO_2$-containing gas which as been purified and cooled is predried in contact with dilute sulfuric acid in a preliminary drying stage, the $SO_2$-containing gas is finally dried with concentrated sulfuric acid, dilute acid from the final dryer is returned to an $SO_3$ absorbing step and dilute sulfuric acid which has been used for predrying is strengthened in a strengthening stage in direct contact with water absorbing gases and is returned to the preliminary drying stage, the improvement wherein:
(a) dilute sulfuric acid having a concentration of 30 to 70 percent by weight is used in the preliminary drying stage:
(b) a partial stream of dilute sulfuric acid is withdrawn from the preliminary drying stage and in said strengthening stage is strengthened in direct contact with water-absorbing gases and is then returned to the preliminary drying stage at a concentration which is 2 to 40% by weight higher than the concentration of the dilute sulfuric acid in the preliminary drying stage;
(c) the partial stream of dilute sulfuric acid is circulated in said strengthening stage of step (b) and is heated therein by an indirect heat exchange;
(d) the dilute sulfuric acid circulating in the preliminary drying stage is cooled by an indirect heat exchange;
(e) the temperature of the $SO_2$-containing gas leaving the preliminary drying stage is maintained as high as or higher than the temperature of the gases entering the preliminary drying stage;
(f) removing more water in the preliminary drying stage than is required to maintain a water balance between the final drying step and the $SO_3$ absorbing step, a portion of the dilute acid from the preliminary drying stage is supplied to the $SO_3$ absorbing step to maintain the water balance in the overall plant; and
(g) sufficient sulfuric acid is supplied from the $SO_3$ absorbing step to the preliminary drying stage to compensate for the dilute acid supplied from the preliminary drying stage to the $SO_3$ absorbing stage.

2. A process according to claim 1 characterized in that a sufficient portion of the dilute acid from the preliminary drying stage is supplied with the spent acid from the final drying stage to the $SO_3$ absorbing stage to form concentrated sulfuric acid.

3. A process according claim 1 wherein the temperature of the $SO_2$-containing gas leaving the preliminary drying stage in step (e) is 5° to 20° C. higher than the temperature of the $SO_2$ containing gas entering the preliminary drying stage.

4. A process according to claim 1 wherein the $SO_2$ gas is subjected to an additional preliminary drying in an additional preliminary drying stage before its drying in the preliminary drying stage of steps (a) to (g), the dilute sulfuric acid used for the first preliminary drying is strengthened in an additional strengthening stage in direct contact with water-absorbing gases approximately to the concentration required for said additional preliminary drying and is then re-used for said additional preliminary drying.

5. A process according to claim 4 wherein the first preliminary drying is effected with the gas and dilute sulfuric acid flowing countercurrently to each other.

6. A process according to claim 1 wherein the preliminary drying is effected in two series-connected preliminary driers, a partial stream of the dilute sulfuric acid from the second preliminary dryer in the gas flow path is fed to the first preliminary dryer, the dilute sulfuric acid is maintained at a higher concentration in the second preliminary drier than in the first preliminary dryer, strengthenin is effected intwo strengtheners, which are connected in series in the acid flow path, a stream of the dilute sulfuric acid is fed from the first preliminary drier to the first strengthener, the strengthened dilute sulfuric acid is fed from the first strengthener to the second strengthener, strengthened dilute sulfuric acid is fed from the second strengthener to the second preliminary drier.

7. A process according to claim 1 wherein the temperature of the $SO_2$-containing gases leaving the final drier is controlled at 70° to 90° C.

8. A process according to claim 1 wherein an $SO_2$-containing gas of $SO_2$ content greater than 4 volume percent is treated by splitting the same into at least two portions, feeding at least a sufficient protion to said preliminary drying stage so that when the gas from the preliminary drying stage is recombined with the other portion, the recombined gas stream has a water content such that the amount of water removed from the total gas stream is more than required to maintain a water balance between the final drying step and the $SO_3$ absorbing step.

* * * * *

UNITED STATES PATENT AND TRADEMARK OFFICE
CERTIFICATE OF CORRECTION

PATENT NO. : 4,333,917
DATED : Jun. 8, 1982
INVENTOR(S) : Karl H. Dörr et al

It is certified that error appears in the above—identified patent and that said Letters Patent is hereby corrected as shown below:

Title Page Priority    Delete "Oct. 2," and insert --Feb. 10,--.

Signed and Sealed this

Twenth-eighth Day of September 1982

[SEAL]

Attest:

GERALD J. MOSSINGHOFF

Attesting Officer    Commissioner of Patents and Trademarks